United States Patent
Murphy

(10) Patent No.: US 9,863,318 B2
(45) Date of Patent: Jan. 9, 2018

(54) THERMAL MANAGEMENT SYSTEM FOR GAS TURBINE ENGINE

(71) Applicant: United Technologies Corporation, Hartford, CT (US)

(72) Inventor: Michael Joseph Murphy, Windsor, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 563 days.

(21) Appl. No.: 14/533,611

(22) Filed: Nov. 5, 2014

(65) Prior Publication Data

US 2015/0052907 A1    Feb. 26, 2015

Related U.S. Application Data

(62) Division of application No. 13/096,130, filed on Apr. 28, 2011, now Pat. No. 8,904,753.

(51) Int. Cl.

| | | |
|---|---|---|
| F02C 1/00 | (2006.01) | |
| F02C 7/14 | (2006.01) | |
| F01D 17/08 | (2006.01) | |
| F01D 17/14 | (2006.01) | |
| F02K 3/075 | (2006.01) | |
| F02C 9/18 | (2006.01) | |
| F01D 25/12 | (2006.01) | |
| F02C 7/18 | (2006.01) | |

(52) U.S. Cl.
CPC ............... *F02C 7/14* (2013.01); *F01D 17/085* (2013.01); *F01D 17/148* (2013.01); *F01D 25/12* (2013.01); *F02C 7/185* (2013.01); *F02C 9/18* (2013.01); *F02K 3/075* (2013.01); *F05D 2260/213* (2013.01); *F05D 2260/232* (2013.01); *F05D 2270/303* (2013.01); *Y02T 50/675* (2013.01)

(58) Field of Classification Search
CPC ...... F02C 7/14; F02C 6/16; B64D 2013/0603; B64D 2013/0618; B64D 2013/0625
See application file for complete search history.

(56) References Cited

U.S. PATENT DOCUMENTS

| | | | |
|---|---|---|---|
| 5,085,037 A | 2/1992 | Scott-Scott | |
| 5,121,598 A * | 6/1992 | Butler | ............ F02C 7/14 60/39.08 |
| 5,123,242 A * | 6/1992 | Miller | ............ F02C 7/14 165/300 |
| 5,241,814 A | 9/1993 | Butler | |

(Continued)

FOREIGN PATENT DOCUMENTS

| | | |
|---|---|---|
| GB | 2241742 | 9/1991 |
| GB | 2474567 | 4/2011 |

(Continued)

OTHER PUBLICATIONS

European Search Report for European Patent Application No. 12162781.4 completed Nov. 12, 2015.

*Primary Examiner* — Gerald L Sung
(74) *Attorney, Agent, or Firm* — Carlson, Gaskey & Olds, P.C.

(57) ABSTRACT

A method of thermal management for a gas turbine engine comprising selectively positioning a valve to communicate a bypass flow into either an Environmental Control System (ECS) pre-cooler or an Air Oil Cooler (AOC) "peaker" through a common inlet.

12 Claims, 4 Drawing Sheets

(56) References Cited

U.S. PATENT DOCUMENTS

| | | | |
|---|---|---|---|
| 5,438,823 A | 8/1995 | Loxley et al. | |
| 5,918,458 A | 7/1999 | Coffinberry et al. | |
| 7,454,894 B2 | 11/2008 | Larkin et al. | |
| 7,509,793 B2 | 3/2009 | Tumelty et al. | |
| 8,257,024 B1 * | 9/2012 | Phillips | F01D 25/18 184/104.1 |
| 2008/0028763 A1 | 2/2008 | Schwarz et al. | |
| 2008/0230651 A1 | 9/2008 | Porte | |
| 2009/0188234 A1 * | 7/2009 | Suciu | F02C 7/14 60/262 |

FOREIGN PATENT DOCUMENTS

| | | |
|---|---|---|
| WO | 03044327 | 5/2003 |
| WO | 2009140100 | 11/2009 |

* cited by examiner

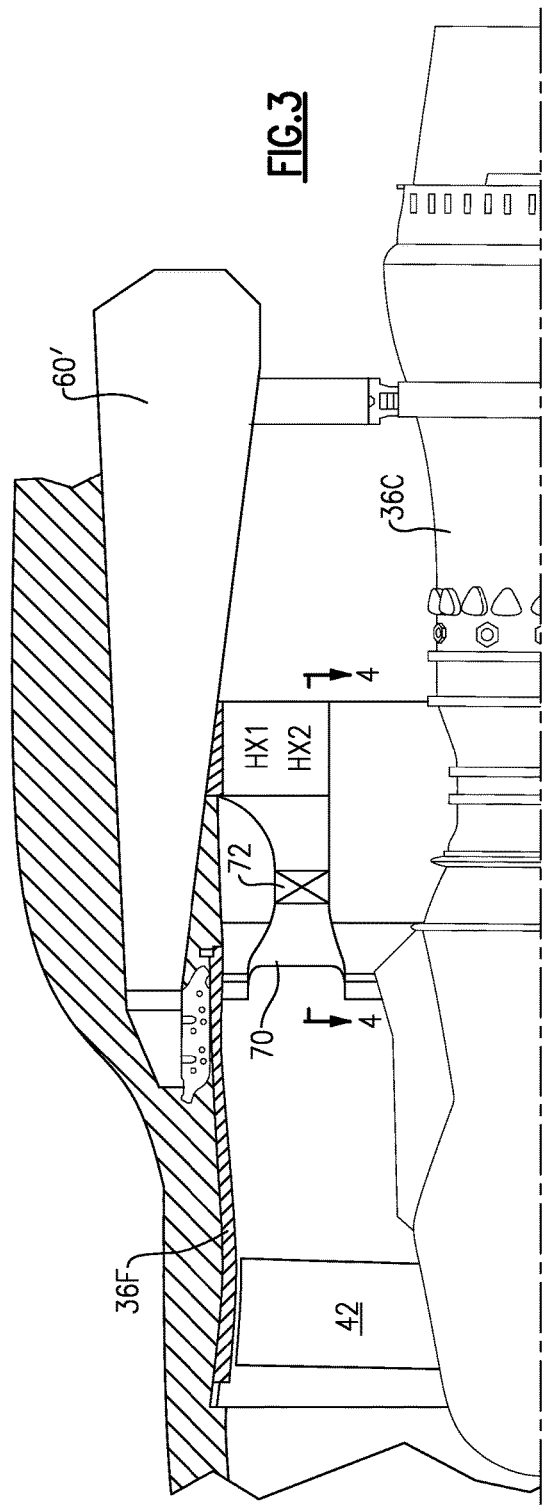
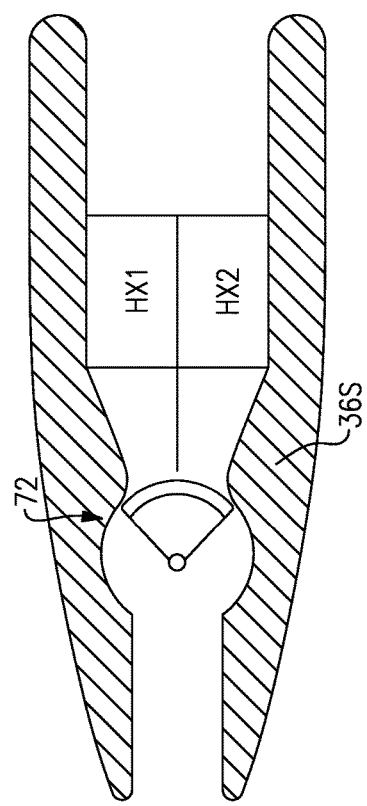

THERMAL MANAGEMENT SYSTEM FOR GAS TURBINE ENGINE

CROSS-REFERENCE TO RELATED APPLICATION

This application is a divisional of U.S. patent application Ser. No. 13/096,130, filed Apr. 28, 2011.

BACKGROUND

The present disclosure relates to a gas turbine engine, and in particular, to a Thermal Management Systems (TMS) therefore.

Thermal Management Systems (TMS) include heat exchangers and associated equipment that utilize a pressurized lubricant. During usage, the lubricant receives thermal energy. The heat of the lubricants in such systems has increased due to the use of larger electrical generators for increased electrical power production and geared turbofans with large fan-drive gearboxes.

In one TMS, a duct is provided in a fan cowling through which a portion of the airstream is diverted, such that the lubricant is cooled by the ducted airstream. The airstream that is diverted through the duct system flows at least in part through an air-to-liquid heat exchanger which is sized to provide adequate cooling for the most extreme "corner point" conditions (hot day, idle, hot fuel). These heat exchangers may require relatively large cross-sectional area ducts that may result in additional drag.

Alternately, a base heat exchange that handles a significant portion of the mission points is combined with a so-called "peaker" heat exchanger to handle corner point conditions. One such TMS locates the "peaker" on the engine fan case which also requires oil lines and valves to be located along the fan case. This arrangement may require additional auxiliary inlets and outlets which may also result in additional drag.

SUMMARY

A method of thermal management for a gas turbine engine according to an example of the present disclosure includes selectively positioning a valve to communicate a bypass flow into either an Environmental Control System (ECS) pre-cooler or an Air Oil Cooler (AOC) "peaker" through a common inlet.

A further embodiment of the foregoing embodiments includes communicating the bypass airflow to the ECS pre-cooler during cold operations.

A further embodiment of any of the foregoing embodiments includes communicating the bypass airflow to the AOC "peaker" during hot operations.

A further embodiment of any of the foregoing embodiments includes communicating an exhaust flow from the ECS pre-cooler or AOC "peaker" into a core engine.

A further embodiment of any of the foregoing embodiments includes providing a compressor section, a turbine section, and a combustor section in the core engine.

In a further embodiment of any of the foregoing embodiments, the compressor section is configured to drive a core flow through the core engine.

A further embodiment of any of the foregoing embodiments includes communicating an exhaust flow from the ECS pre-cooler or AOC "peaker" overboard of the gas turbine engine.

A further embodiment of any of the foregoing embodiments includes driving the bypass flow to the valve via a fan.

In a further embodiment of any of the foregoing embodiments, selectively positioning the valve includes rotating the valve.

In a further embodiment of any of the foregoing embodiments, selectively positioning the valve includes blocking bypass flow into both the ECS pre-cooler and the AOC "peaker."

In a further embodiment of any of the foregoing embodiments, the valve communicates the bypass flow into either the ECS pre-cooler or the AOC "peaker" via first and second ducts, respectively.

In a further embodiment of any of the foregoing embodiments, selectively positioning the valve includes at least partially blocking bypass flow into at least one of the first and second ducts.

In a further embodiment of any of the foregoing embodiments, selectively positioning the valve includes fully blocking bypass flow into at least one of the first and second ducts.

In a further embodiment of any of the foregoing embodiments, selectively positioning the valve is accomplished by a control system.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 3 is a side partial phantom view of another non-limiting embodiment of a thermal management system;

FIG. 4 is a top view of the thermal management system of FIG. 3;

DETAILED DESCRIPTION

Figure 1:
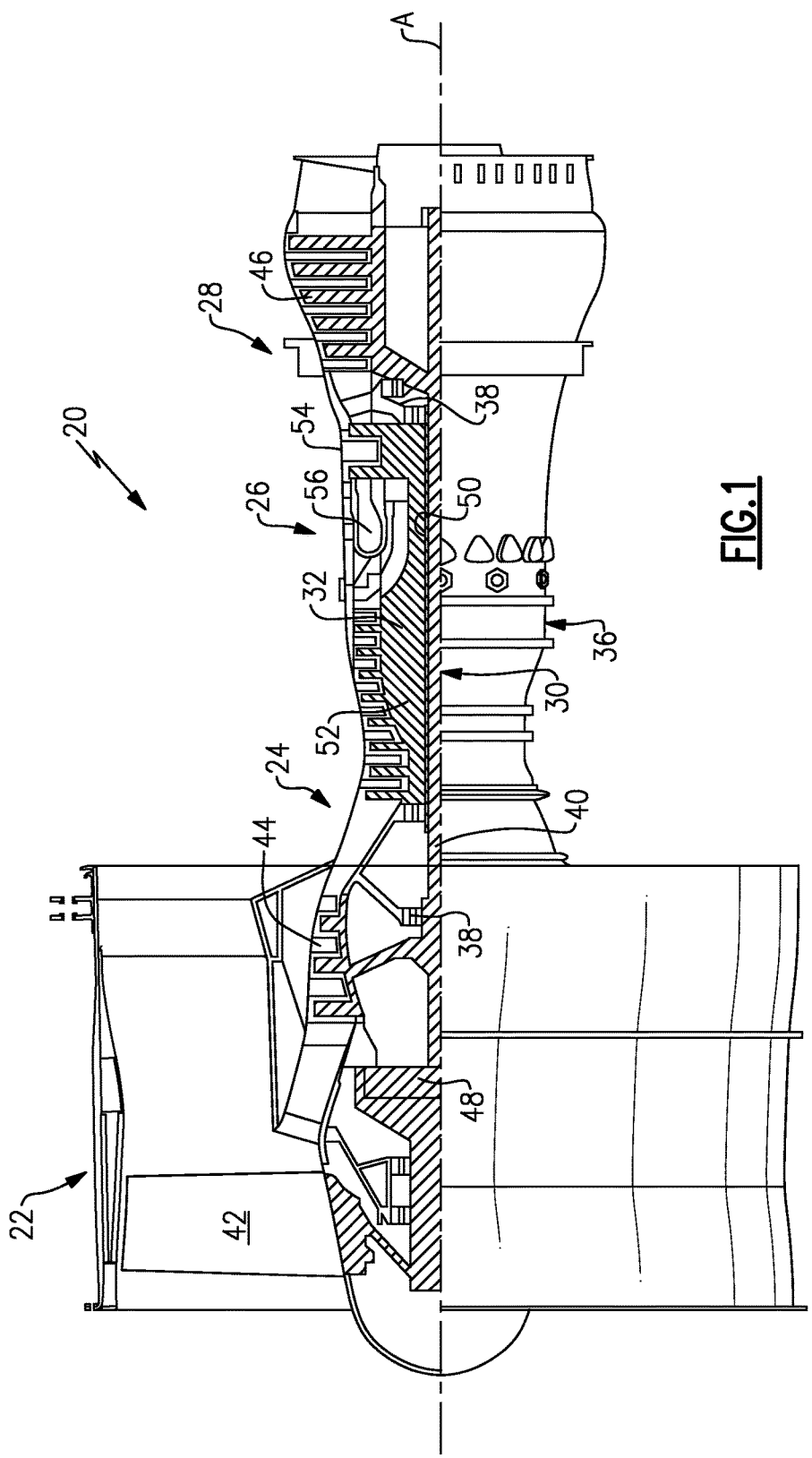
FIG. 1 is a general schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed with fuel and burned in the combustor 56, then expanded over the high pressure turbine 54 and low pressure turbine 46. The turbines 54, 46 rotationally drive the respective low speed spool 30 and high speed spool 32 in response to the expansion.

Figure 2:
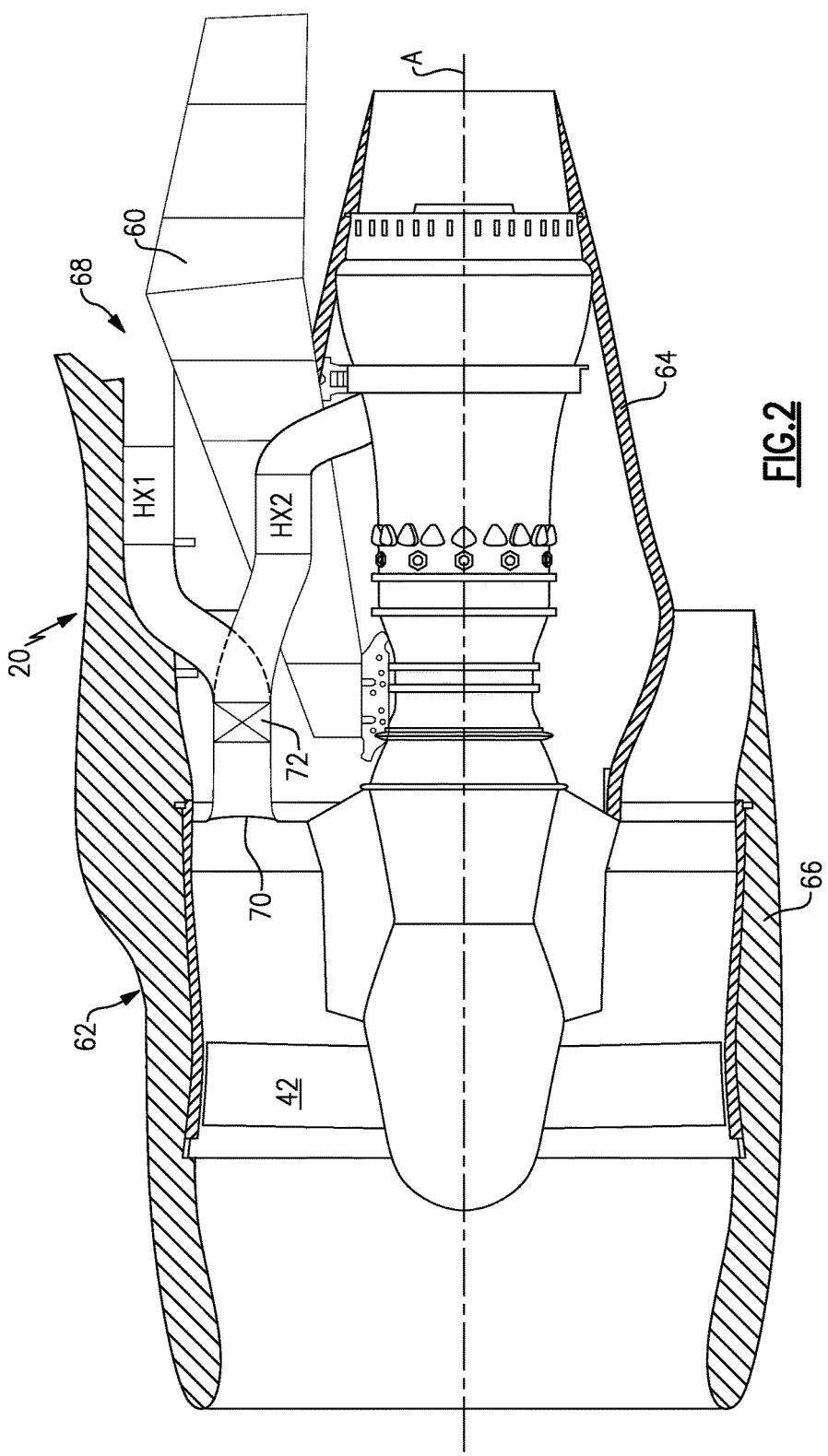
FIG. 2 is a side partial sectional view of one embodiment of a thermal management system.

With reference to FIG. 2, the gas turbine engine 20 is mounted to an engine pylon structure 60 within an engine nacelle assembly 62 as is typical of an aircraft designed for subsonic operation. The nacelle assembly 62 generally includes a core nacelle 64 and a fan nacelle 66. A thermal management system (TMS) 68 is at least partially integrated into the nacelle assembly 62. It should be understood that although a particular component arrangement is disclosed in the illustrated embodiment, various pylon structures and nacelle assemblies will benefit herefrom.

The TMS 68 includes a first heat exchanger HX1 and a second heat exchanger HX2 which are both in communication with the bypass flow through a common inlet 70. It should be understood that the heat exchangers HX1, HX2 may be air/fluid, or air/air heat exchangers. Air/fluid heat exchangers are typically utilized to cool engine fluids to maintain low temperatures and air/air heat exchangers are typically utilized to cool high-temperature engine air for use in the aircraft cabin. In one non-limiting embodiment, the first heat exchanger HX1 is an Environmental Control System (ECS) pre-cooler and the second heat exchanger HX2 is an Air Oil Cooler (AOC) "peaker". The ECS pre-cooler may be located within an engine strut fairing. In another disclosed, non-limiting embodiment, the first heat exchanger HX1 and/or the second heat exchanger HX2 is suspended from a pylon 60' within an engine strut 36S (FIGS. 3 and 4) if the engine pylon 60' mounts to the engine fan case 36F rather than the core case 36C.

A "Fan Air Modulating Valve" (FAMV) 72 in communication with the inlet 70 selectively directs a portion of the bypass flow to either of the heat exchangers HX1, HX2. The FAMV 72 varies the bypass flow and thereby selectively controls the bypass air to the heat exchangers HX1, HX2. The exhaust flow from the heat exchangers HX1, HX2 may then be dumped into the core engine and/or overboard.

The ECS pre-cooler system is typically placed under high demand during cold operation while the engine AOC "peaker" is typically utilized during hot operations which include "corner point" conditions such that the FAMV 72 selectively directs the bypass airflow as required in a mutually exclusive manner. A duct 74 downstream of the FAMV 72 thereby communicates a portion of bypass flow to either of the heat exchangers HX1, HX2.

The thermal management system (TMS) 68 thereby minimizes the number of additionally auxiliary inlets and outlets required in the propulsion system to integrate the AOC "peaker". Additionally, the thermal management system (TMS) 68 does not require engine powered fans to drive the flow thru the AOC "peaker" to minimize or eliminate additional oil lines and electrical supply/control lines to the fan case.

Figure 5:
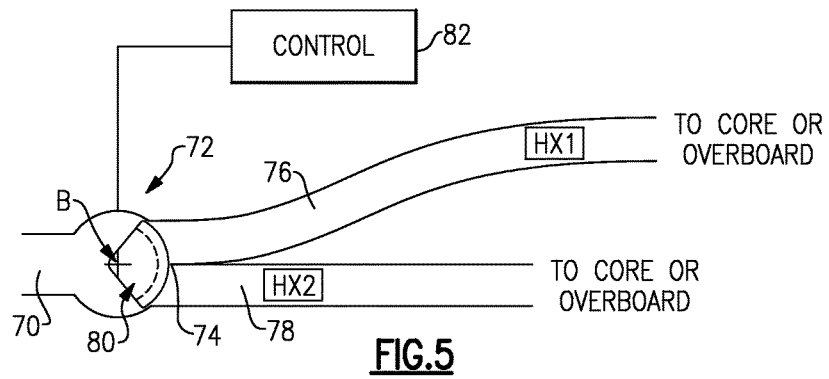
FIG. 5 is an expanded view of a valve arrangement for the thermal management system in first position.
Figure 6:
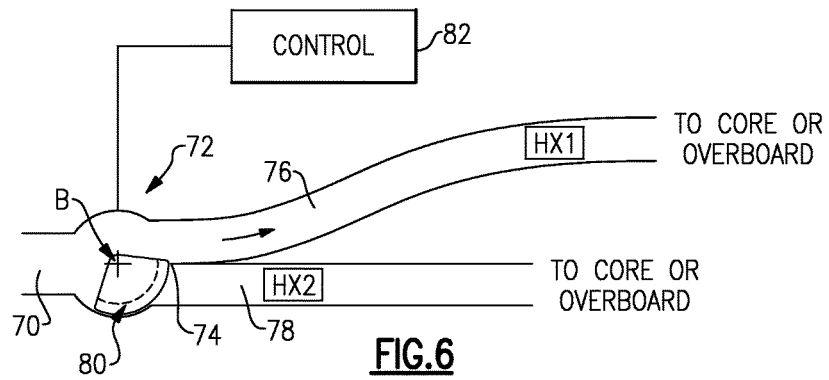
FIG. 6 is an expanded view of the valve arrangement for the thermal management system in second position.
Figure 7:
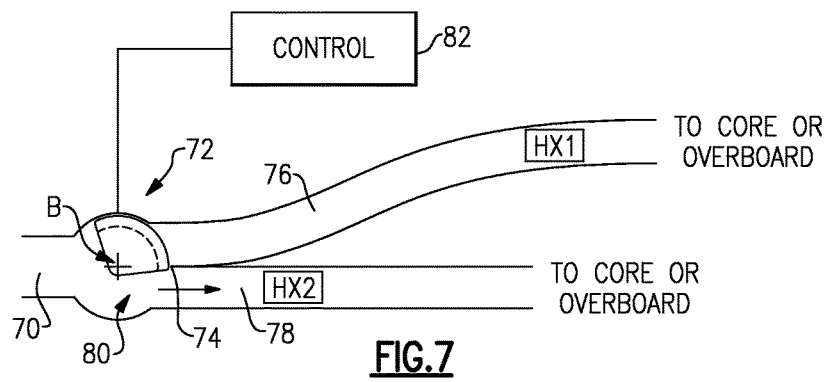
FIG. 7 is an expanded view of the valve arrangement for the thermal management system in third position.

With reference to FIG. 5, the FAMV 72 is in communication with the common inlet 70 to selectively direct the portion of the bypass flow to either of the heat exchangers HX1, HX2 through respective duct 76, 78 (FIGS. 6, 7). In one non-limiting embodiment, the FAMV 72 includes a valve 80 which rotates about an axis of rotation B to selectively open the respective duct 76, 78 to inlet 70. The FAMV 72 provides an essentially infinite position to control bypass flow into the respective duct 76, 78. That is, the FAMV 72 is positioned by a control system 82 to, for example, partially open the respective duct 76, 78 and control the quantity of bypass flow thereto. The FAMV 72 may also be positioned to close both the respective ducts 76, 78 (FIG. 5).

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason, the appended claims should be studied to determine true scope and content.

What is claimed:

1. A method of thermal management for a gas turbine engine comprising:
   selectively positioning a valve to communicate a bypass flow into either an Environmental Control System (ECS) pre-cooler or an Air Oil Cooler (AOC) "peaker" through a common inlet.

2. The method as recited in claim 1, further comprising: communicating an exhaust flow from the ECS pre-cooler or AOC "peaker" into a core engine.

3. The method as recited in claim 2, further comprising: providing a compressor section, a turbine section, and a combustor section in the core engine.

4. The method as recited in claim 3, wherein the compressor section is configured to drive a core flow through the core engine.

5. The method as recited in claim 1, further comprising: communicating an exhaust flow from the ECS pre-cooler or AOC "peaker" overboard of the gas turbine engine.

6. The method as recited in claim 1, further comprising driving the bypass flow to the valve via a fan.

7. The method as recited in claim 1, wherein selectively positioning the valve includes rotating the valve.

8. The method as recited in claim 1, wherein selectively positioning the valve includes blocking bypass flow into both the ECS pre-cooler and the AOC "peaker".

9. The method as recited in claim 1, wherein the valve communicates the bypass flow into either the ECS pre-cooler or the AOC "peaker" via first and second ducts, respectively.

10. The method as recited in claim 9, wherein selectively positioning the valve includes at least partially blocking bypass flow into at least one of the first and second ducts.

11. The method as recited in claim 9, wherein selectively positioning the valve includes fully blocking bypass flow into at least one of the first and second ducts.

12. The method as recited in claim 1, wherein selectively positioning the valve is accomplished by a control system.

* * * * *